(12) United States Patent
Fuller et al.

(10) Patent No.: US 11,580,631 B2
(45) Date of Patent: Feb. 14, 2023

(54) PLATFORM AND METHODS FOR DYNAMIC THIN FILM MEASUREMENTS USING HYPERSPECTRAL IMAGING

(71) Applicant: The Board of Trustees of the Leland Stanford Junior University, Stanford, CA (US)

(72) Inventors: Gerald G. Fuller, Stanford, CA (US); Vineeth Chandran Suja, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 181 days.

(21) Appl. No.: 17/175,799

(22) Filed: Feb. 15, 2021

(65) Prior Publication Data

US 2021/0264582 A1 Aug. 26, 2021

Related U.S. Application Data

(60) Provisional application No. 62/979,126, filed on Feb. 20, 2020.

(51) Int. Cl.
| | | |
|---|---|---|
| G06T 7/00 | (2017.01) | |
| G06T 7/60 | (2017.01) | |
| G06T 5/00 | (2006.01) | |
| G06T 5/20 | (2006.01) | |

(Continued)

(52) U.S. Cl.
CPC .......... *G06T 7/001* (2013.01); *G01B 11/0675* (2013.01); *G06T 5/002* (2013.01);

(Continued)

(58) Field of Classification Search
CPC .......... G06T 7/001; G06T 5/002; G06T 5/20; G06T 5/50; G06T 7/60; G06T 2207/20224; G06T 2207/30108; G06T 7/62; G06T 7/0004; G01B 11/0675; G01B 11/0625; G01B 11/0641; G01J 3/2823;

(Continued)

(56) References Cited

U.S. PATENT DOCUMENTS

| | | | |
|---|---|---|---|
| 2005/0174583 A1* | 8/2005 | Chalmers ............ | G03F 7/70483 356/630 |
| 2005/0174584 A1* | 8/2005 | Chalmers ............. | G01N 21/956 356/630 |

(Continued)

*Primary Examiner* — Jose L Couso
(74) *Attorney, Agent, or Firm* — Lumen Patent Firm (57) ABSTRACT

Dynamic thin film interferometry is a technique used to non-invasively characterize the thickness of thin liquid films that are evolving in both space and time. Recovering the underlying thickness from the captured interferograms, unconditionally and automatically is still an open problem. A compact setup is provided employing a snapshot hyperspectral camera and the related algorithms for the automated determination of thickness profiles of dynamic thin liquid films. The technique is shown to recover film thickness profiles to within 100 nm of accuracy as compared to those profiles reconstructed through the manual color matching process. Characteristics and advantages of hyperspectral interferometry are discussed including the increased robustness against imaging noise as well as the ability to perform thickness reconstruction without considering the absolute light intensity information.

10 Claims, 11 Drawing Sheets

(51) Int. Cl.
  *G01B 11/06* (2006.01)
  *G06T 5/50* (2006.01)
(52) U.S. Cl.
  CPC ............... *G06T 5/20* (2013.01); *G06T 5/50* (2013.01); *G06T 7/60* (2013.01); *G06T 2207/20224* (2013.01); *G06T 2207/30108* (2013.01)
(58) Field of Classification Search
  CPC ............ G01J 3/2889; G01J 3/433; G01N 2021/1765; G01N 2021/213; G01N 21/8422; G01N 21/8851
  See application file for complete search history.

(56) References Cited

U.S. PATENT DOCUMENTS

| | | | | |
|---|---|---|---|---|
| 2013/0293842 | A1* | 11/2013 | Grenon | G01B 11/0625 359/584 |
| 2013/0308095 | A1* | 11/2013 | Korb | G06T 5/50 351/246 |
| 2014/0104574 | A1* | 4/2014 | Grenon | A61B 3/1005 351/246 |
| 2015/0203966 | A1* | 7/2015 | Budiarto | H01J 37/32972 118/712 |
| 2015/0235108 | A1* | 8/2015 | Pandev | G06V 10/772 382/149 |
| 2018/0108578 | A1* | 4/2018 | Pandev | G01N 21/9503 |
| 2019/0244374 | A1* | 8/2019 | Benvegnu | G06T 7/90 |
| 2020/0258214 | A1* | 8/2020 | Motamedi | G06T 7/0006 |
| 2020/0405146 | A1* | 12/2020 | Cao | A61B 3/102 |

\* cited by examiner

PLATFORM AND METHODS FOR DYNAMIC THIN FILM MEASUREMENTS USING HYPERSPECTRAL IMAGING

CROSS-REFERENCE TO RELATED APPLICATIONS

This application claims priority from U.S. Provisional Patent Application 62/979,126 filed Feb. 20, 2020, which is incorporated herein by reference.

FIELD OF THE INVENTION

This invention relates to methods, systems and platforms for dynamic thin film measurements using hyperspectral imaging.

BACKGROUND OF THE INVENTION

Hyperspectral imaging is a spectral imaging technique that combines spectroscopy and digital photography, thus yielding a spectrum at each pixel in the image of a scene. Due to the enhanced spectral resolution, hyperspectral imaging has been used for many remote sensing applications such as monitoring agriculture and vegetation, and for detecting mineral and oil deposits. Recently, hyperspectral imaging techniques have proliferated medical imaging, including for cancer tissue detection and ophthalmology. Furthermore, hyperspectral imaging is increasingly being used for industrial machine vision applications such as for food and process quality control. As hyperspectral imagers are rapidly becoming more robust, compact and economical, this technology is poised to significantly revolutionize machine vision in many different settings.

One such setting is dynamic thin film interferometry. Thin film interferometry is a technique that employs light interference to measure thickness of films that are usually a few microns thick. Thin film interferometry has been used since the early 1950's to characterize static films, and in the subsequent years the technique was adopted for studying dynamic thin liquid films that have a spatially and temporally evolving thickness profile. This technique has since then become the conventional method for characterizing thin liquid films in research settings, primarily due to its simplicity and non-invasive nature. Some of the important areas that make use of this technique includes characterizing foam and emulsion stability, drop impacts, tear films and liquid film coatings. Despite the popularity of the technique in research settings, dynamic thin liquid film interferometry has not proliferated industrial or commercial settings.

The primary obstacle that prevents the widespread commercial use of interferometry for characterizing dynamic thin films is the difficulty in automatically analyzing the interferograms to recover the underlying film thicknesses. The automatic analysis is complicated by the transcendental phase-periodic governing equations that non-uniquely relates the pixel intensities in interferograms to film thicknesses. This inherent complexity is amplified by the uncertainty introduced by the unavoidable imaging and background noise. As a result, the unconditional determination of the thickness of spatiotemporally evolving thin films from interferograms has remained a challenging research problem since the inception of this technique.

Researchers have traditionally side stepped this problem broadly by the following approaches. One of the approaches involves manually identifying the film thickness at a region utilizing a reference colormap. This approach, though robust, yet is quite slow and suffers from human subjectivity. Another common approach utilizes fringe counting from a known absolute reference thickness in the film. This approach is fast, yet still not robust and requires assumptions on the spatial structure of the film. Yet another approach involves pre-calibrating the pixel intensities in interferograms to film thicknesses utilizing liquid films of known thickness profiles. This approach is fast and robust, however this technique is restricted to scenarios where such calibrations are possible.

SUMMARY OF THE INVENTION

This invention provides a platform and methods for the measurement of thickness of dynamic thin films using hyperspectral imaging. In an exemplary embodiment of the invention for foam stability assessment, a bubble is formed in a chamber filled with the liquid of interest using a syringe pump. The chamber is then moved down. This moves the bubble to the air liquid interface, trapping a thin liquid film. This film is illuminated using a broadband dome light and imaged using a snapshot hyperspectral camera. The measurement is continued till the film ruptures. An automated setup then repeats the whole measurement for the specified number of times for establishing statistical confidence.

To recover the film thickness from the hyperspectral image, an algorithm was developed and executed utilizing Matlab. Initially, the raw images from the snapshot HSI camera were sliced and spliced appropriately to reconstruct the hyperspectral cubes. Subsequently, background subtraction was performed on the cubes, followed by cropping, denoising, intensity correction and normalization. A k-Nearest neighbor search utilizing the cosine distance metric is performed between each pixel in the resulting HSI cube and a theoretical spectral-map. The thicknesses obtained as the first nearest neighbor in the k-Nearest neighbor search is used to construct the initial estimate of the thickness profile. Finally, a spatial optimization algorithm is utilized to correct for the any incorrectly assigned points. The algorithm basically enforces spatial continuity in film thickness by replacing any incorrectly assigned thickness with an appropriate thickness from the k possible thickness values at that point.

In another exemplary embodiment, a method is provided for dynamic thin film measurements using hyperspectral imaging. In the method, two-dimensional hyperspectral data of interference patterns of a dynamic thin film are processed by: (i) constructing a three-dimensional hyperspectral cube from the two-dimensional hyperspectral data, (ii) subtracting a background spectrum from spectra in the three-dimensional hyperspectral cube, and (ii) denoising the background subtracted three-dimensional hyperspectral cube to obtain a preprocessed three-dimensional hyperspectral cube. The method then further distinguishes matching the processed three-dimensional hyperspectral cube to a reference spectral map to obtain an initial thickness profile of the thin film by: (j) generating the reference spectral map that defines a mapping between a physical thickness of the dynamic thin film and a corresponding spectral signature as expected to be observed by the hyperspectral imager, and (j) applying geometric analysis and neighbor matching between each spectrum in the preprocessed three-dimensional hyperspectral cube and the reference generated spectral map to arrive at the initial thickness of the dynamic thin film. Then the method performs spatial optimization in an iterative process on the initial thin film thickness profile to obtain a final thin film thickness profile.

In yet another embodiment, the invention can be described as a method for dynamic thin film measurements using hyperspectral imaging. Two-dimensional hyperspectral data of interference patterns of a dynamic thin film is acquired using a hyperspectral imager. Thickness profiles of the dynamic thin film are then recovered from the acquired two-dimensional hyperspectral data by the following steps:
(i) preprocessing the acquired two-dimensional hyperspectral data by (j) constructing a three-dimensional hyperspectral cube from the acquired two-dimensional hyperspectral data, (jj) subtracting an acquired background spectrum from every spectrum in the three-dimensional hyperspectral cube; and (jjj) denoising (e.g. hybrid mean filter) the background subtracted three-dimensional hyperspectral cube to obtain a preprocessed three-dimensional hyperspectral cube.)
(ii) matching the preprocessed three-dimensional hyperspectral cube to a reference spectral map to obtain an initial thickness profile of the thin film by (p) generating the reference spectral map that defines a mapping between a physical thickness of the dynamic thin film and a corresponding spectral signature as expected to be observed by the hyperspectral imager according to thin interference theory; and (pp) applying geometric analysis and neighbor matching (e.g., using cosine distance metric) between each spectrum in the preprocessed three-dimensional hyperspectral cube and the reference generated spectral map to arrive at the initial thickness of the dynamic thin film; and
(iii) performing spatial optimization in an iterative process on the initial thin film thickness profile to obtain a final thin film thickness profile.

In one example for the embodiments, the step of denoising is applying a hybrid mean filter.

In another example for the embodiments, the corresponding spectral signature is corresponding spectral signature as expected to be observed by the hyperspectral imager according to thin interference theory.

In yet another example for the embodiments, the dynamic thin film is a film whose thickness varies both in space and time.

In still another example for the embodiments, the dynamic thin film is a film whose thickness is not larger than 4 to 5 microns.

Definitions

A dynamic thin film is a film whose thickness varies both in space and time.

A dynamic thin film is a film whose thickness is not larger than 4 to 5 microns.

Embodiments of the invention can be in for example tear film diagnosis over contact lenses, a diagnostic tool in ophthalmology clinics, foam stability measurement, a potential R&D tool for lubricant manufactures, personal care product developers and protein formulation scientists to name a few.

Advantages and improvements over existing methods, devices or materials is that the embodiments of this invention are robust against imaging noise and are automated. In addition, the current invention has a high dynamic thickness measurement range spanning from 50 nanometers to over 3.5 microns, or in another example from 100s of nanometers to a few microns. For the embodiments in this invention, high thickness measurement frequency can be up to 10 Hz and expected to extend this to larger than 25 Hz. High spatial resolution and measurement area can be obtained of larger than 5000 points in a region of 0.5×0.5 mm.

BRIEF DESCRIPTION OF THE DRAWINGS

FIGS. 1A-C show according to an exemplary embodiment of the invention a schematic of the experimental setup along with the details of hyperspectral camera used in this study.

FIGS. 2A-B show according to an exemplary embodiment of the invention the spectral map and a block diagram showing the thickness reconstruction pipeline.

FIGS. 3A-F show according to an exemplary embodiment of the invention the thickness reconstruction performance of the snapshot hyperspectral interferometry technique. These hyperspectral interferograms were acquired over bubbles in silicone oil mixtures at 10 frames per second.

FIGS. 4A-B show according to an exemplary embodiment of the invention in FIG. 4A robustness against noise as a function of number and type filters in a camera. The reconstruction accuracy is seen to increase with the number of channels in the camera. Further, a hypothetical camera with perfect (hat function) filters is seen to require the least number of channels for a high-fidelity thickness reconstruction.

FIGS. 5-6 show according to an exemplary embodiment of the invention details on the assumption of normal incidence and an uncertainty analysis related to the refractive index.

DETAILED DESCRIPTION

In this invention, an arrangement is provided utilizing hyperspectral imaging for the unconditional and automated reconstruction of thickness profiles from thin liquid film interferograms. Approaches utilizing hyperspectral imaging (using the pushbroom like techniques) have previously been reported for characterizing static thin films. However, these approaches are not suited for dynamic films, primarily due to the nature of image acquisition, and to the best of inventors' knowledge have never been modified for use with dynamic films. Here, the inventors describe a compact setup employing a snapshot hyperspectral imager and the related algorithms for automated determination of thickness profiles of thin films.

Theory

The theory of thin film interference was formalized in the early 19th century by Fresnel, and has since been discussed by many researchers in the context of measuring the thickness of thin films such as for bubbles, tear films, and for surface profiling. Here a brief formulation is described relevant for a hyperspectral camera.

Consider a beam of light having intensity $I_0(\lambda)$ incident on a thin liquid film of thickness d and refractive index $n_2$. The film is bounded on top and bottom by media having refractive indices $n_1$ and $n_3$ respectively. Assuming normal incidence and nondispersive films, the reflected light intensity $I(d, \lambda)$ emanating from the thin film can be written as, $$\frac{I(\lambda, d)}{I_0(\lambda)} = R_1 + R_2(1-R_1)^2 + 2\sqrt{R_1 R_2 (1-R_1)^2} \cos(\phi) \quad (1)$$

$$\phi = \frac{4\pi n_2 d}{\lambda} + \pi(\mathbb{1}(n_2 > n_1)) + \pi(\mathbb{1}(n_3 > n_2)). \quad (2)$$

Here $\lambda$ is the wavelength of light, $\phi$ is the phase difference and $\mathbb{1}$ is the indicator function that captures the phase shift of $\pi$ radians that occurs when light passes in to a medium with a higher refractive index. $R_1$ and $R_2$ are the power (intensity) reflectivity coefficients obtained from the Fresnel equations evaluated for normal incidence, and are given by, $$R_1 = \left(\frac{n_1 - n_2}{n_1 + n_2}\right)^2 \quad (3)$$

$$R_2 = \left(\frac{n_2 - n_3}{n_2 + n_3}\right)^2. \quad (4)$$

Finally, the intensity perceived by the ith channel of a pixel H in a hyperspectral camera as a function of the film thickness can be computed as, $$H_i(d) = \int_{\lambda_0}^{\lambda_f} I(\lambda, d) I_r(\lambda) S_i(\lambda) d\lambda. \quad (5)$$

Figure 5:
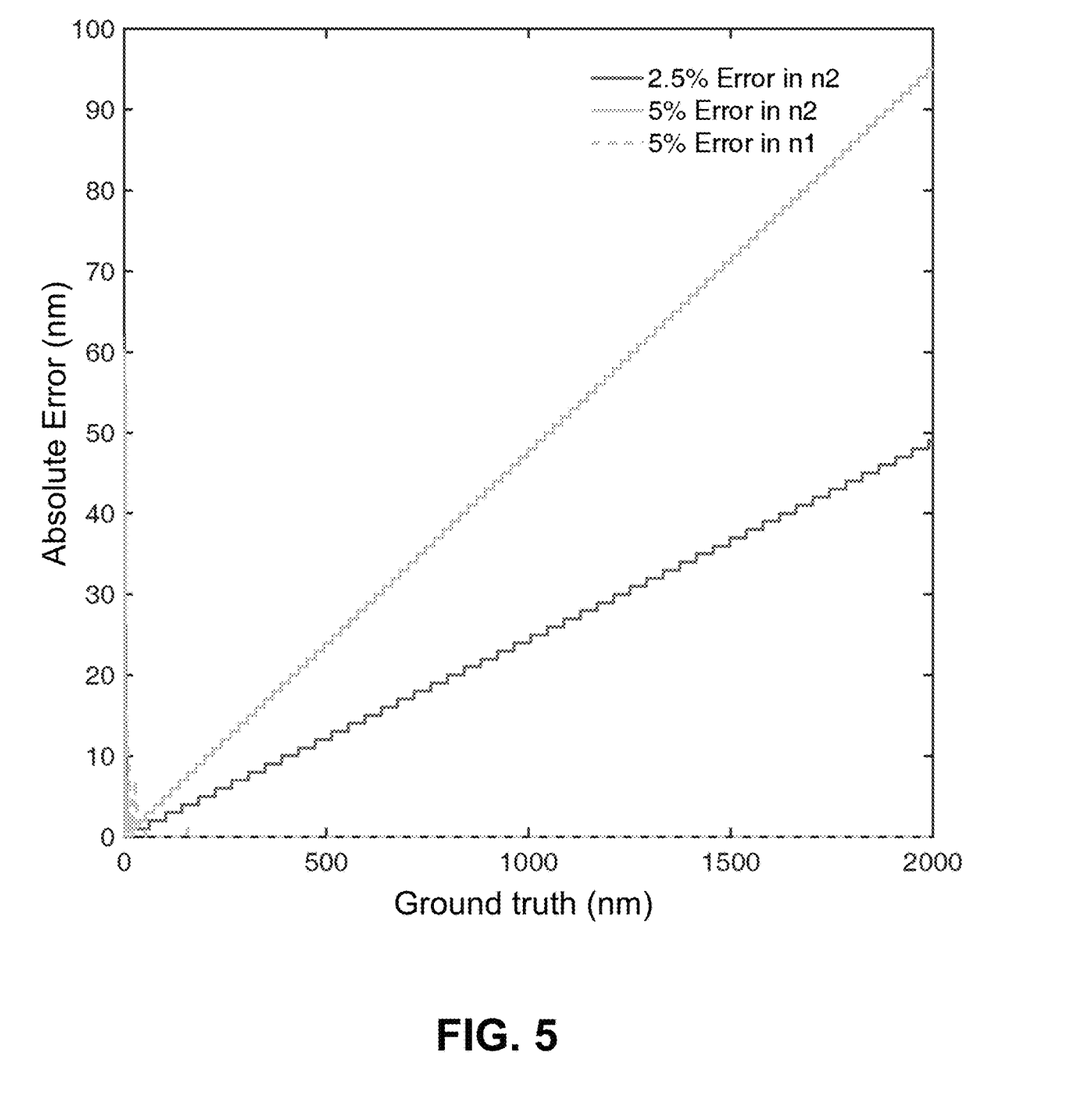
FIG. 5: The results from numerical experiments showing the influence of the error in the refractive index on the accuracy of the calculated thickness. For these numerical experiments, similar to the other numerical experiments reported in the manuscript, a ramp profile was constructed and the corresponding interferogram was determined. Subsequently, the thickness corresponding to the interferogram was reconstructed with different magnitudes of error imposed on the refractive index.
Figure 6:
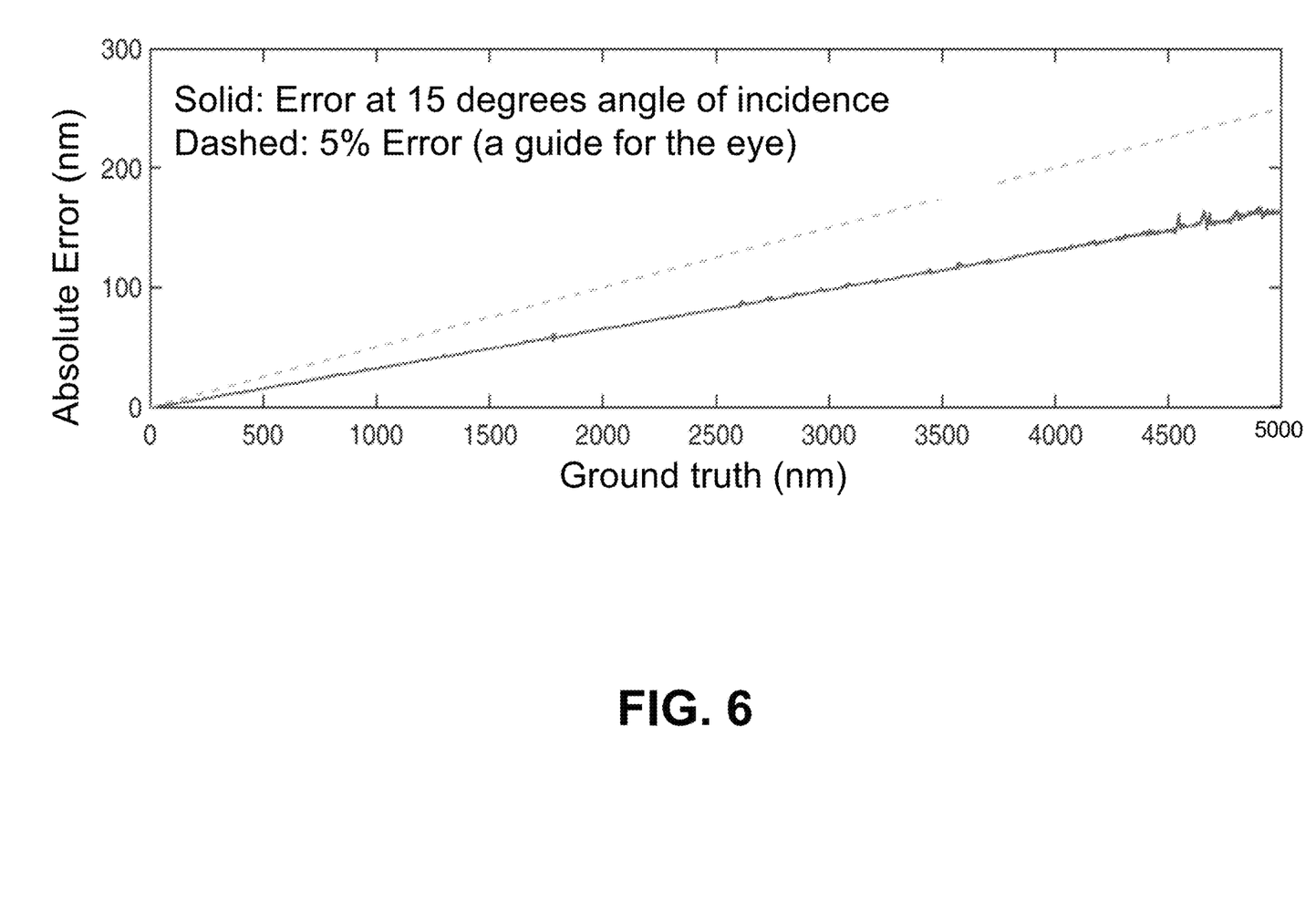
FIG. 6: Absolute error in thickness estimation when assuming normal incidence for reflected light rays having an angle of incidence of 15 degrees. Even at 15 degrees, the maximum expected from geometrical calculations based on the angular extend of the interferogram in FIGS. 3A-F and the corresponding bubble radius, the error is much less than 5%. Note that this error can be significant at higher angles.

Here Ir ($\lambda$) is the spectral response of filters in the system, $\lambda_0$ and $\lambda_f$ are the smallest and largest wavelengths within the global band pass filter transmission window, and $Si(\lambda)$ is the spectral sensitivity of the $i^{th}$ channel of a pixel. See FIGS. 5-6 on details on the assumption of normal incidence and an uncertainty analysis related to the refractive index.

During an experiment (FIGS. 1A-C), a hyperspectral camera having h channels at every pixel will encode reflections from a thin film of thickness d as a h dimensional vector. Utilizing Eq. 5, one can invert this h dimensional vector to recover the thickness of the thin film. In principle, when using an RGB camera this can be accomplished by first generating a color map that establishes a color to film thickness relationship (FIG. 1C), and subsequently using this map to assign thicknesses to colors in the interferogram. Unfortunately, due to the periodic nature of the cosine function, the generated color map for a RGB camera has nearly identical colors mapping to different thicknesses. Coupled with the imaging noise, the automated mapping of colors to interference patterns becomes infeasible. Hence in practice, a manual matching process is usually adopted, the details of which are available in Frostad et al. (Dynamic fluid-film interferometry as a predictor of bulk foam properties. Soft Matter 12, 9266-9279, 2016). In the subsequent sections, the use of hyperspectral imaging is described for automatically reconstructing film thickness from interferograms utilizing a spectral map obtained from Eq. 5.

Experimental Setup

The single bubble coalescence experiments used to validate the utility of hyperspectral imaging for thin film thickness measurements were performed using a modified Dynamic Fluid-Film Interferometer (DFI). The construction and the utility of the DFI has been previously discussed.

Figure 1A:
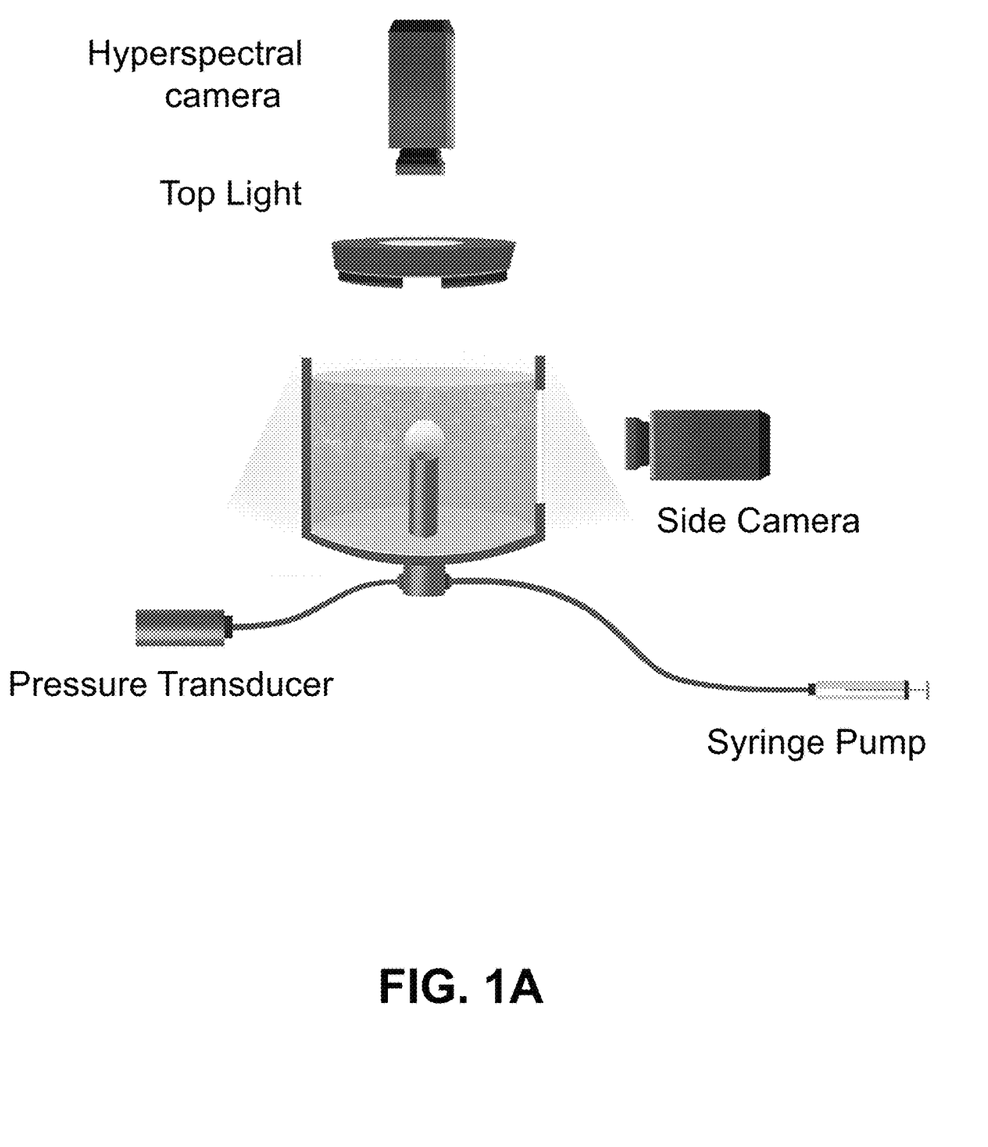
FIG. 1A: The experimental arrangement used to record the hyperspectral interferograms. Here the camera, the lens and the light are vertically above the thin film.
Figure 1B:
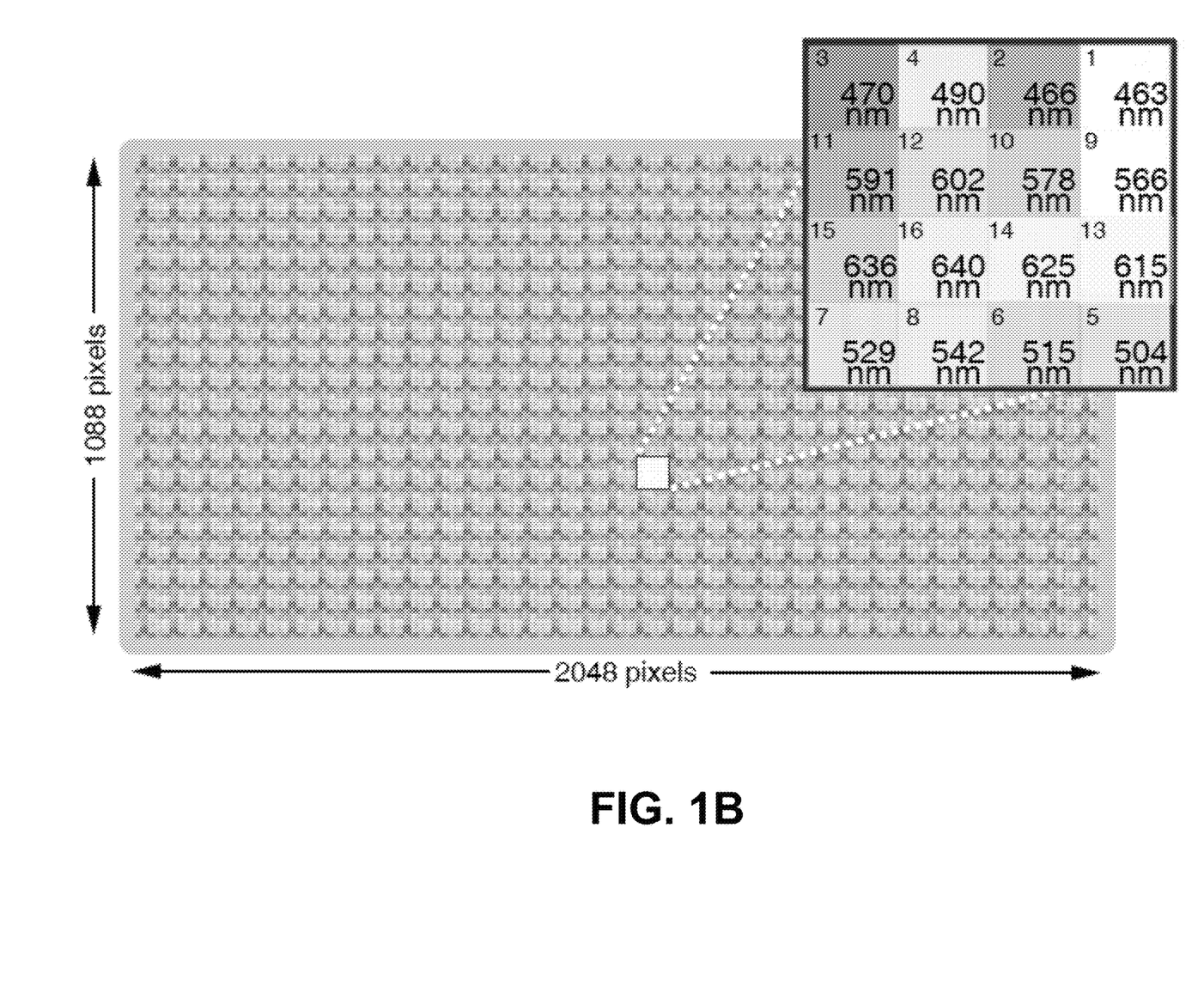
FIG. 1B: Details of the fabry-perot filter array inside the snapshot hyperspectral camera. Each fabry-perot filter in the repeating filter array unit is numbered according to the ascending order of the peak wavelengths of the filters in that unit.
Figure 1C:
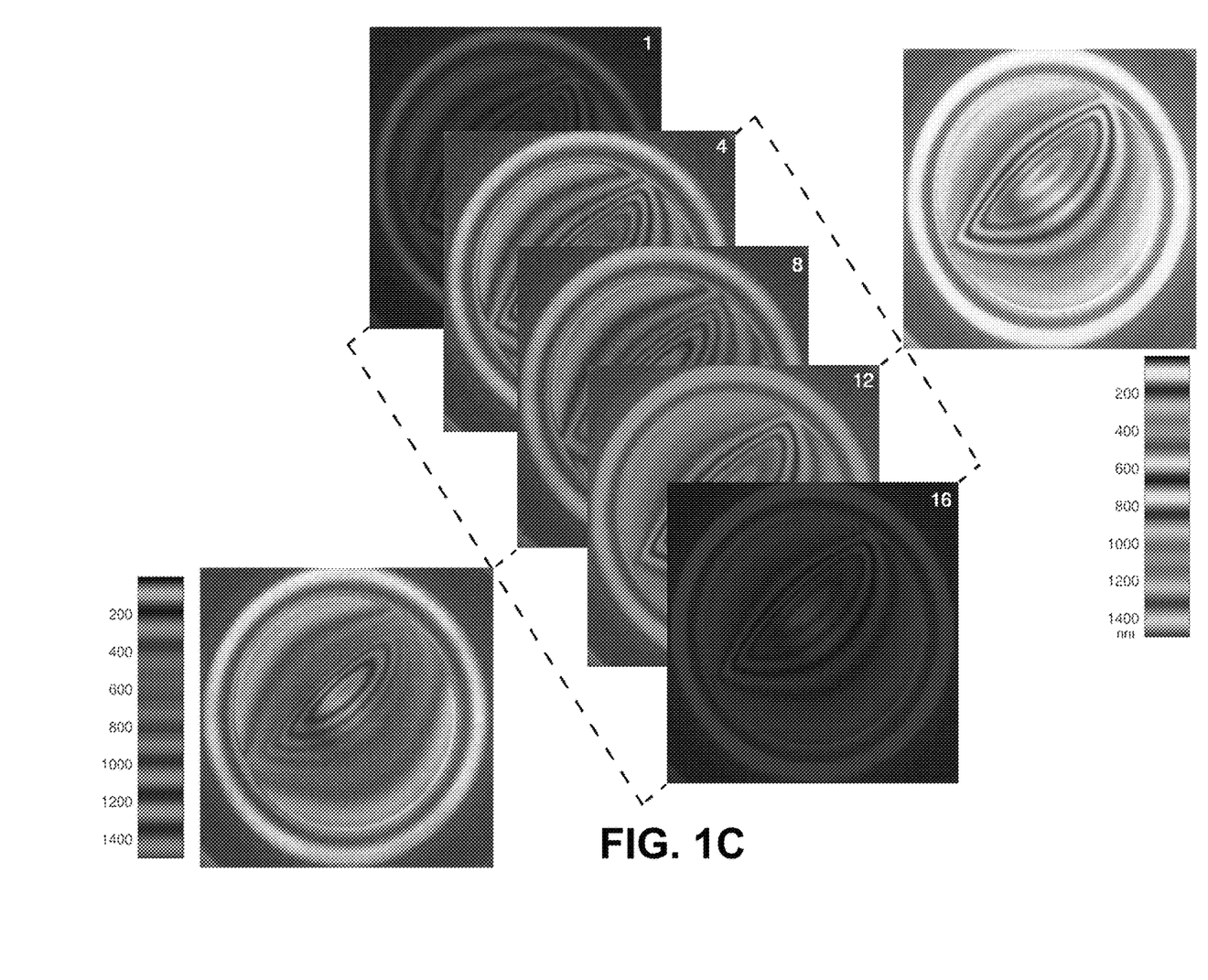
FIG. 1C: Five slices from the HSI cube showing the inteferograms obtained from a bubble in a silicone oil mixture along with two RGB composites generated by combining bands 1, 8, 16 and bands 4, 12, 16. The colormaps corresponding to the RGB composites are shown alongside; RGB image, herein reproduced in grey scale. Such RGB composites are useful for visualizing hyperspectral interferograms, and in this case also qualitatively illustrates how hyperspectral imaging can overcome the non-uniqueness between film thickness and color associated with the traditional RGB interferometry.

For the current study and for the purposes of this invention, the DFI was modified to have a 16-channel snapshot HyperSpectral Imaging (HSI) camera (Model: MQ022HG-IM-SM4X4-VIS, Manufacturer: Ximea GmbH, Germany) having a maximum acquisition frame rate of 170 frames per second as its top camera (FIG. 1A). As the filter array inside the HSI camera has narrow spectral response bands, the dichroic triband filter utilized with the top light for the same purpose (reducing the FWHM of spectral bands of an RGB camera) was removed. The removal of the dichroic filter thus resulted in 120% increase in the luminous flux entering camera—improving the signal to noise ratio in the acquired hyperspectral interferograms. Further details of the setup including the make and model of the light are available in Frostad et al. (Dynamic fluid-film interferometry as a predictor of bulk foam properties. Soft Matter 12, 9266-9279, 2016).

To benchmark the thin film measurement capability of the hyperspectral camera, single bubble experiments were also performed using RGB cameras (IDS UI 3060CP), commonly used for thin film interferometery.

Image Processing

Figure 2A:
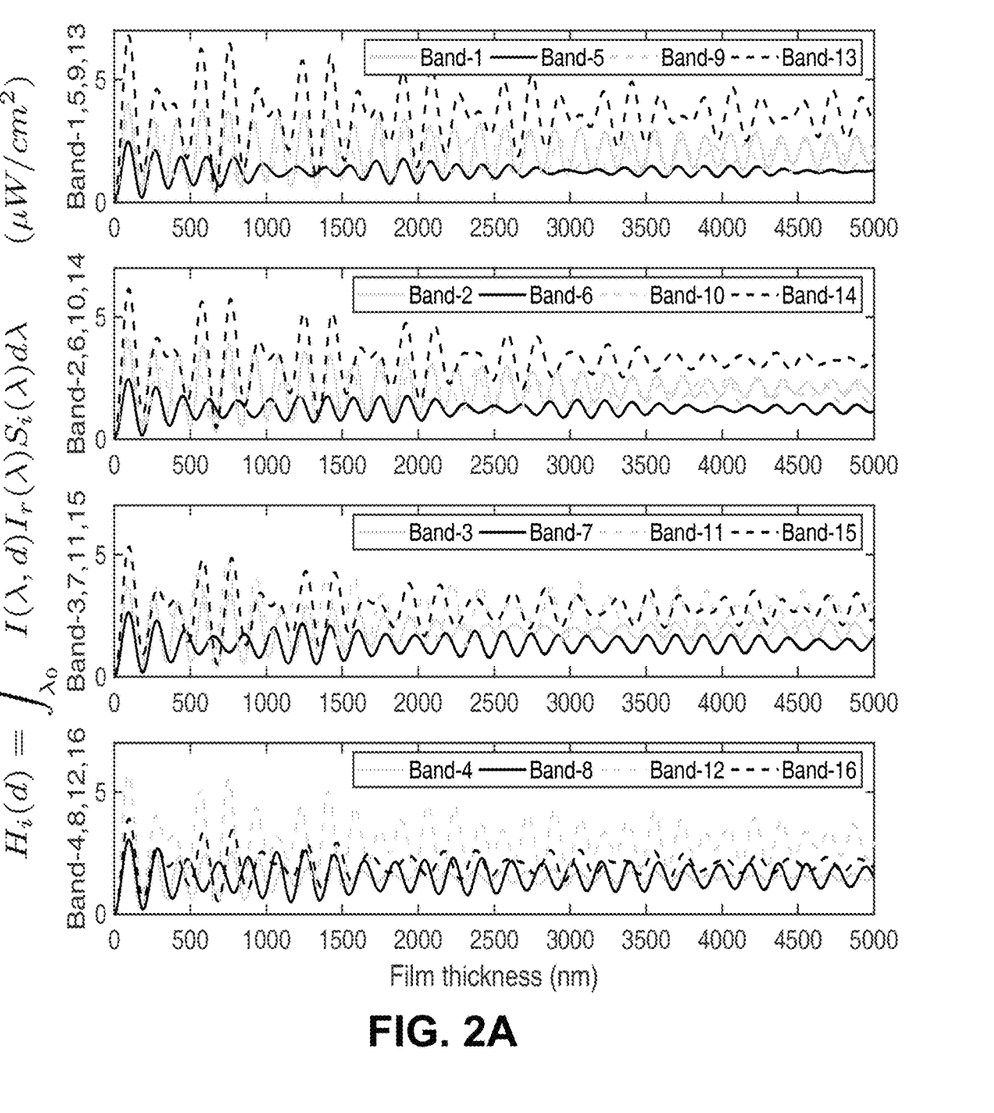
FIG. 2A: The spectral map obtained from Eq. 5 showing the theoretical spectral signature perceived by the different channels in the camera as a function of the film thickness. Here the inventors assumed a silicone oil film bounded by air on either side (refractive index triplet—[1 1.4 1]). Note that there is a continuous variation of the spectrum as a function of the film thickness.

To recover the film thickness from the hyperspectral image, the following steps were executed utilizing Matlab. Initially, the raw images from the snapshot HSI camera were sliced and spliced appropriately to reconstruct the hyperspectral cubes. Subsequently, background subtraction was performed on the cubes, followed by cropping, intensity correction and normalization. Background subtraction is accomplished by imaging the measurement region in the absence of the thin film and subtracting this background spectrum from the measured spectrum. Intensity correction when necessary (for flat field corrections) is accomplished by imaging a surface of known reflectivity, and using the result to compute the correction mask for each spectral band. Intensity normalization is accomplished by normalizing the hyperspectral interferogram by the largest intensity in the interferogram. Subsequently, a k-Nearest neighbor search utilizing the cosine distance metric is performed between each pixel in the resulting HSI cube and the theoretical spectral map (FIG. 2A) generated from Eq. 5. The thicknesses obtained as the first nearest neighbor in the k-Nearest neighbor search is used to construct the initial estimate of the thickness profile.

Figure 2B:
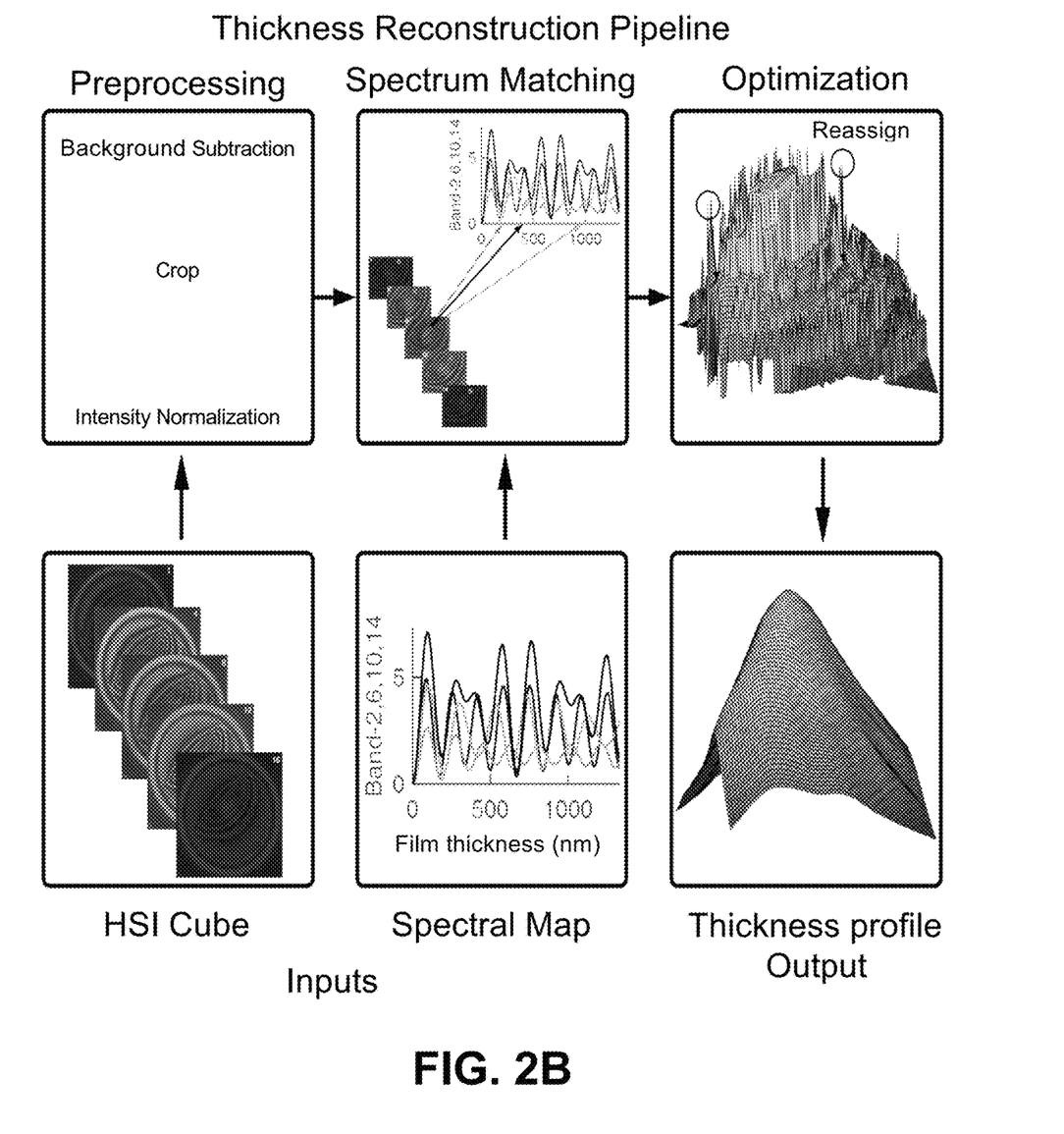
FIG. 2B: A block diagram summarizing the various steps involved in the thickness reconstruction pipeline.

Finally, a spatial optimization algorithm is utilized to correct for the any incorrectly assigned points. The algorithm basically enforces the C.° spatial continuity in film thickness by replacing any incorrectly assigned thickness with an appropriate thickness from the k possible thickness values at that point. In practice, this is accomplished by identifying regions with unphysical gradients and utilizing the gradient descent technique to iteratively correct the thickness in these regions. All steps involved in the thickness reconstruction pipeline is summarized as a block diagram in FIG. 2B.

Thickness Reconstruction Performance

Figures 3A, 3B:
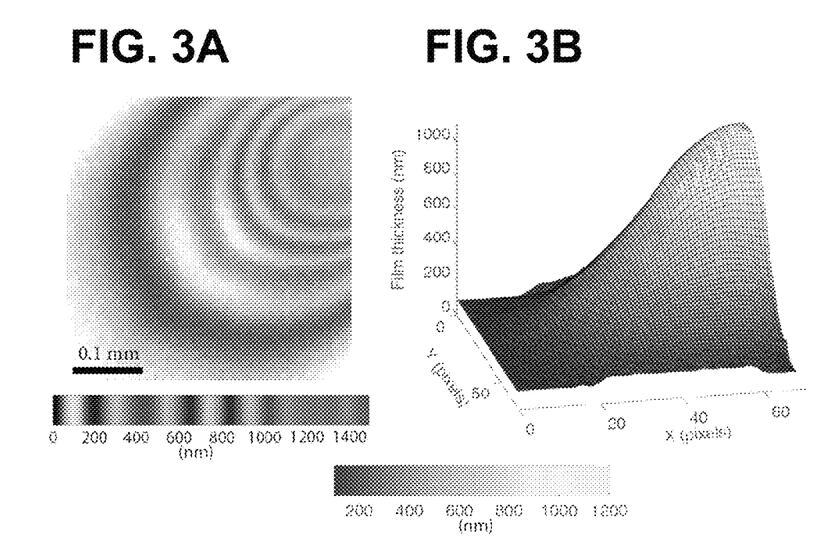
FIG. 3A: The RGB visualization of the hyperspectral interferogram that is used to illustrate the reconstruction performance; RGB image, herein reproduced in grey scale.
FIG. 3B: The manually reconstructed thickness profile (used here as the ground truth).
Figure 3C:
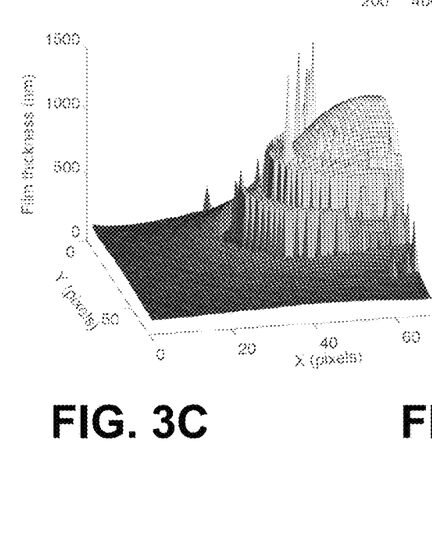
FIG. 3C: The corresponding automatically reconstructed thickness profile.
Figure 3D:
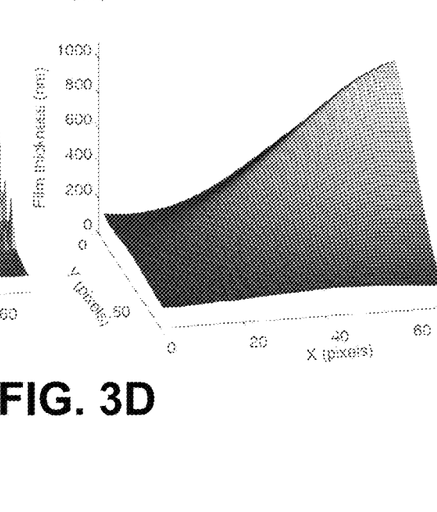
FIG. 3D: The automatically reconstructed thickness profile after optimization.

The performance of the new camera system is established by reconstructing the dynamic film thickness of a bubble in a silicone oil mixture. The results before and after optimization are compared to the manually reconstructed thickness profiles in FIGS. 3A-F. The reconstructed thickness profile before optimization (FIG. 3C) broadly resembles the manually reconstructed profile (FIG. 3B). However, due to noise and spectral mixing in the interference data, there are regions in the reconstructed profile that have physically unrealistic gradients. These artifacts are removed utilizing the optimization routines, and the resultant thickness profile after optimization (FIG. 3D) is seen be very similar to the manually reconstructed profile.

The mean film thickness ($\iint T(x,y)dxdy/\iint dxdy$) a very common metric used to report the thickness of thin films, is very similar across the three cases with values of 358.9 nm, 344.4 nm and 347.9 nm for the manual, unoptimized and optimized thickness profiles respectively.

Figure 3E:
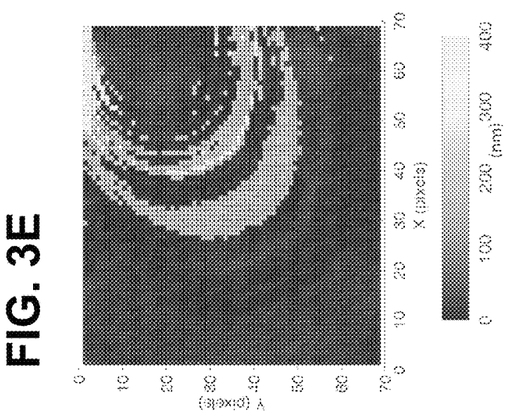
FIG. 3E: The absolute pixel wise height difference between the manual and the unoptimized thickness profile. Over 80% of the pixels differ by 100 nm or less.
Figure 3F:
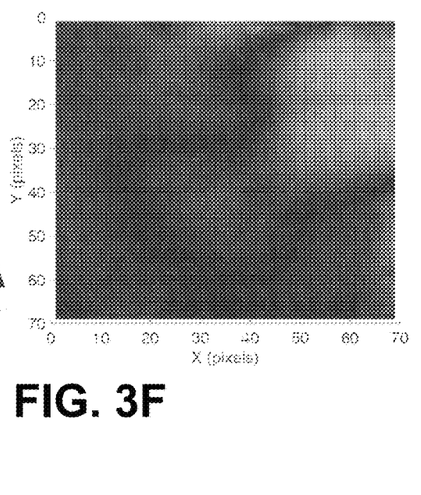
FIG. 3F: The absolute pixel wise height difference between the manual and the optimized thickness profile. Over 90% of the pixels differ by 100 nm or less.
Figure 7:
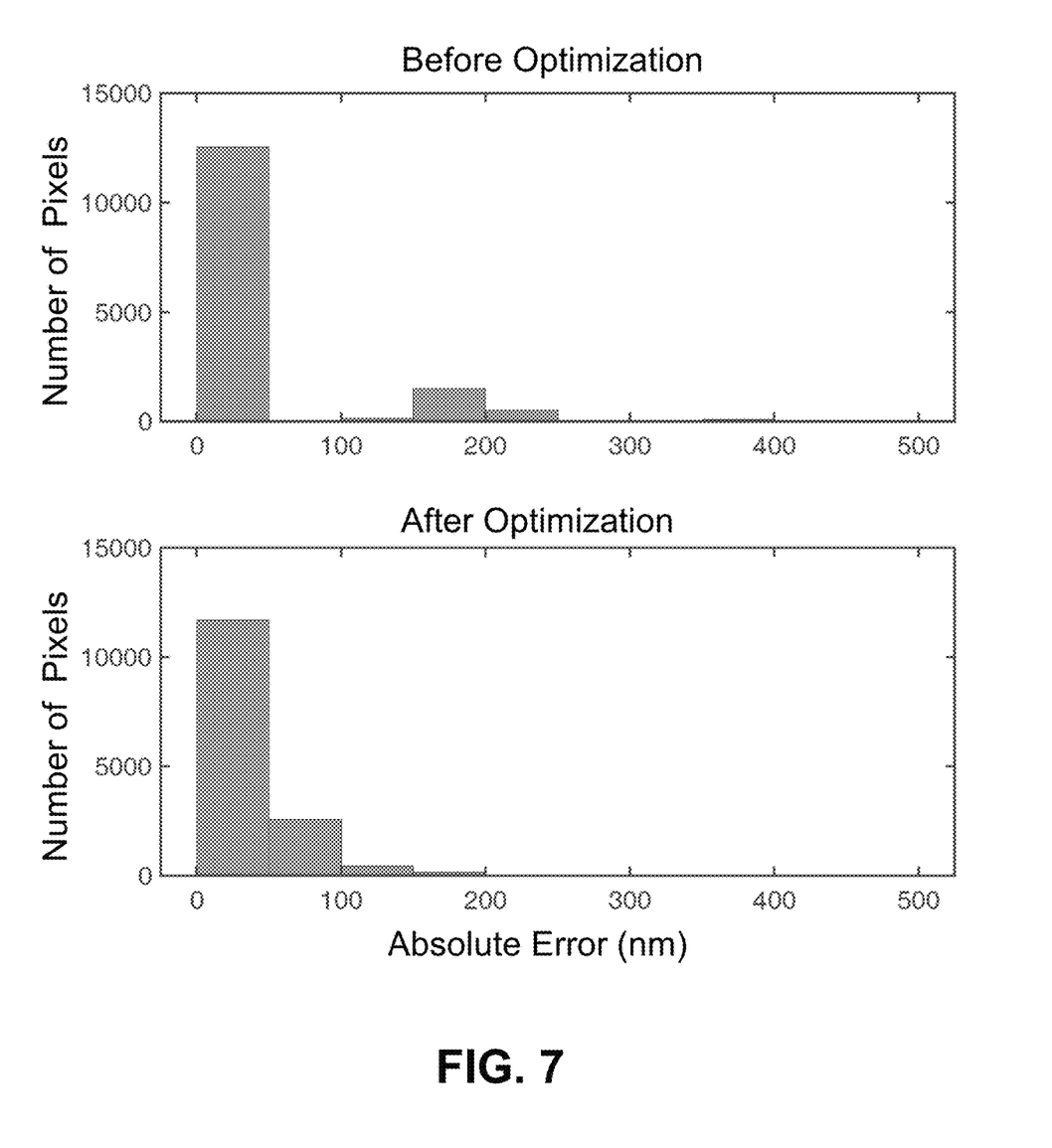
FIG. 7 shows according to an exemplary embodiment of the invention a histogram categorizing the analyzed pixels as a function of the absolute error.

The absolute pixel-wise height difference between the manually reconstructed and the automatically reconstructed thickness profiles pre and post optimization are shown in FIGS. 3E-F. Clearly, the reconstructions are very accurate with over 80% of the pixels differing by less than 100 nm for the unoptimized case, while over 90% of the pixels differ by less than 100 nm for the optimized case (see FIG. 7 for more statistics). The remaining 10% of the regions have errors larger than 100 nm, and are most likely a result of inadequate background subtraction as well as due to the lack of pixel by pixel calibration information for the camera. As a reference, it is also worth noting that reconstructions using the 3-channel data available from a RGB camera has an unacceptable accuracy, with less than 20% of the pixels being classified within 100 nm.

Finally, a convenient advantage of the automated reconstruction is the ease of analyzing time sequential data to obtain the temporal evolution of the film thicknesses.

Robustness Against Noise

Theoretically, the three channels in RGB interferograms are sufficient to disambiguate the underlying film thicknesses. However, in practice, the inherent noise in the acquired image data breaks this theoretical uniqueness between the RGB intensities and the film thickness; thus, requiring optimization (even for static films) and/or calibration for thickness recovery. Unlike the RGB interferograms, hyperspectral interferograms are relatively more robust to noise.

Figure 4A:
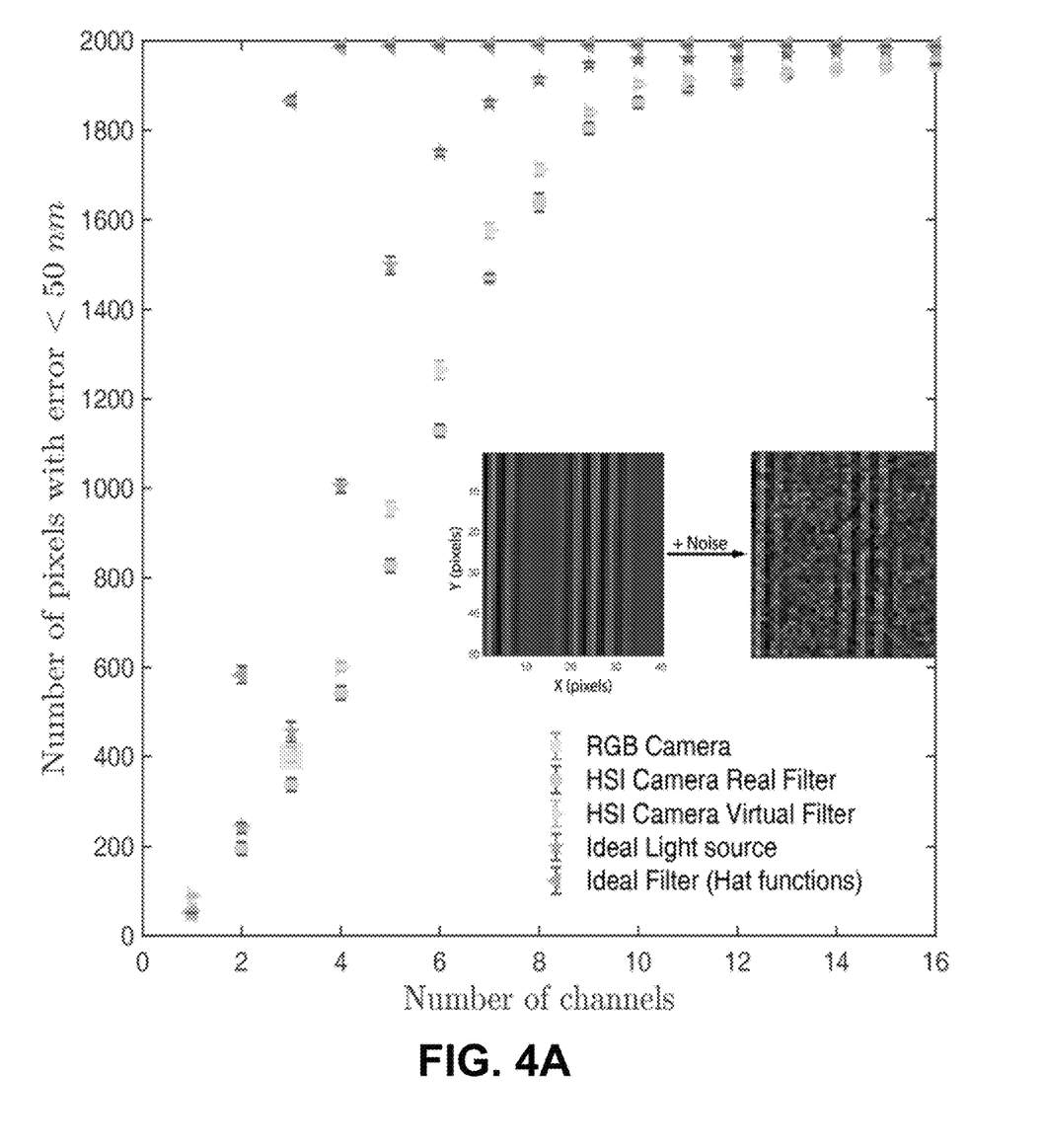

To illustrate the robustness of hyperspectral interferograms against noise, perform numerical experiments were performed using a ramp thickness profile having a minimum thickness of 1 nm and a maximum thickness of 2,000 nm. This thickness profile is mapped to corresponding color interferograms using the color maps of the tested cameras. Subsequently, Gaussian noise is added to the images. Inset in FIG. 4A shows one such RGB image before and after addition of the noise. Reconstruction algorithms (without optimization) are then used to predict the thickness (T) at each pixel in the noisy images. T can be compared to the ground truth thickness ($T^g$) to quantify the reconstruction accuracy. The reconstruction accuracy is visualized in FIG. 4A by plotting the number of pixels having an error of less than 50 nm ($\Sigma_i \mathbb{1}(|T_i^g - T_i| < 50)$) as a function of the number of channels in the camera.

From FIG. 4A one can see that for an RGB camera only about 20% of the pixels are classified within acceptable error. However, for an HSI camera (utilizing all 16 channels) one would be able to recover the thickness from 97% of the pixels within acceptable error; thus showing that HSI cameras are more robust to noise. For the tested HSI camera, one could also obtain similar reconstruction accuracy using either the real or virtual filters on an HSI camera, thus suggesting any type of filter may be used in the reconstruction process. Further one could also see that having an ideal light (uniform intensity across wavelengths) or ideal filters (responses given by hat functions) can enhance the reconstruction performance; with ideal filters having the greatest impact on reconstruction accuracy. Finally, it is also interesting to note that the results indicate that a three-channel camera (RGB camera) with ideal filters has a performance comparable to a regular HSI camera utilizing all 16 channels.

Figure 4B:
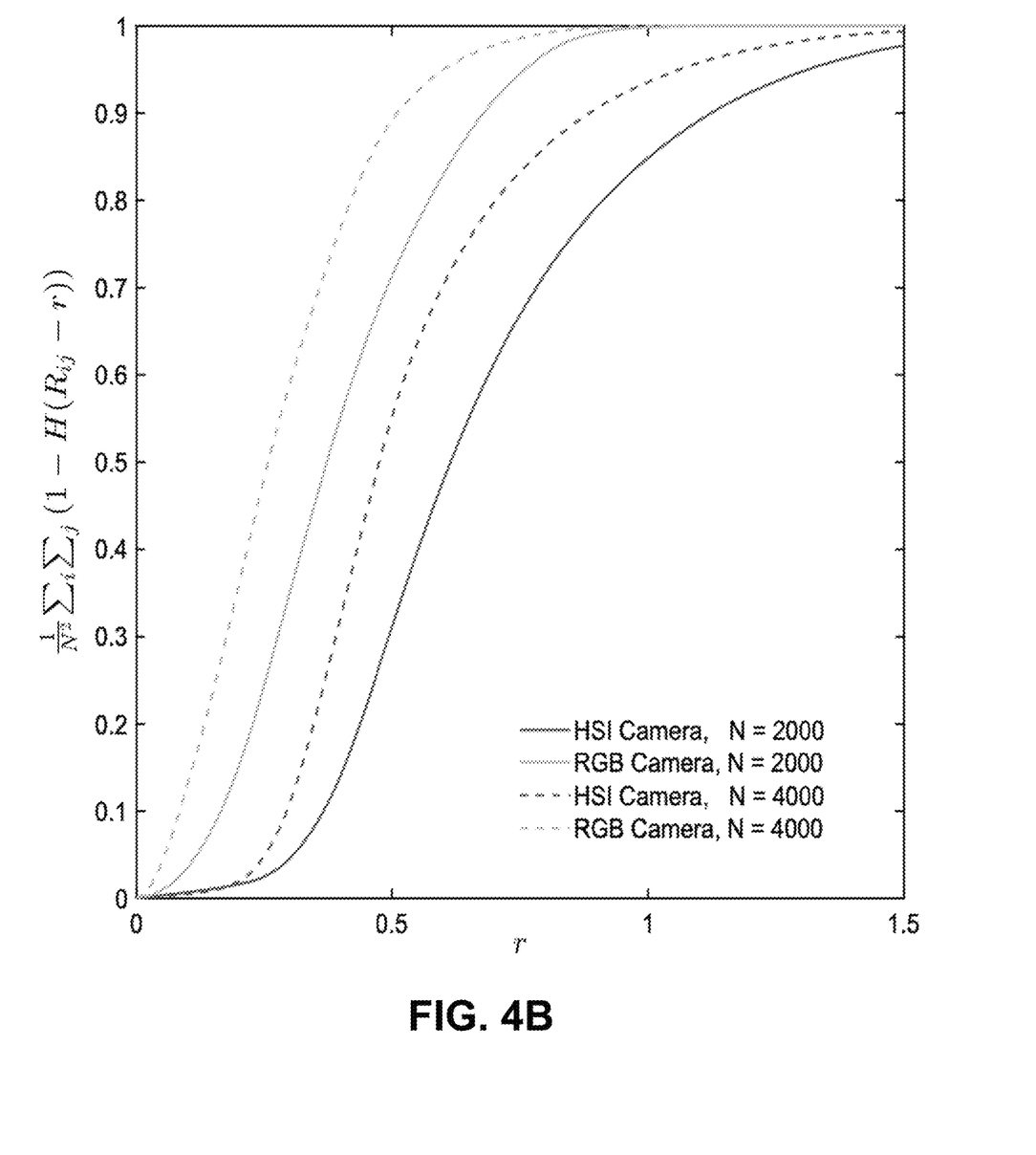
FIG. 4B: The cumulative pair wise distance distributions for the theoretical colormap spectralmap (HSI camera) entries. Here N is the number of contiguous thickness values in the theoretical maps starting at 0 nm and separated by 1 nm. The spectral entries corresponding to a hyperspectral camera are separated by a larger distance (r) as compared to that of an RGB camera.

The increased robustness of HSI interferograms against noise is related to the higher dimensionality of the color co-ordinates that correspond to a given film thickness. As a result of the higher dimensionality, the pair wise Euclidean distances of HSI color co-ordinates are larger than the corresponding pair wise distances of color co-ordinates obtained from an RGB camera. This observation is quantified in FIG. 4B by plotting the cumulative pair wise distance distribution of the color co-ordinates (resolved at every nanometer) for an HSI and a RGB camera for two different film thickness ranges—[0, 2,000] and [0, 4,000] nm. From FIG. 4B, one could clearly see that for a given thickness range, the curves corresponding to HSI cameras as compared to RGB cameras are shifted towards larger distances (r). Hence, as a consequence of the increased separation of HSI color co-ordinates, perturbations due to noise are less likely to result in a color co-ordinate becoming similar to another.

Absolute Light Intensity Independent Thickness Reconstruction

Another advantage of using hyperspectral imaging is that the absolute intensity of light at any point in the interferogram may be neglected during thickness reconstruction. This can be shown to be true using two different arguments. Firstly, standard transformations (such as RGB to HSV) can isolate the intensity information into a single channel. Neglecting the intensity channel, still gives us (for the tested HSI camera) information from 15 channels to unambiguously (see FIGS. 4A-B) reconstruct the thickness. Since an RGB camera has only three channels, neglecting the intensity makes it impossible to unambiguously determine the thickness. Secondly, the cosine distance metric utilized in this invention to determine the film thicknesses completely ignores the intensity information. Despite ignoring the intensity information, the inventors were able to recover the thickness profiles quite well (FIG. 3D), thus confirming that hyperspectral imaging enables thickness reconstruction without necessarily requiring information about the absolute light intensity.

A direct consequence of this result is that the reconstruction techniques described in this invention are robust against the natural spatial variation of incident light intensity (vignetting) over the interferogram. Hence in addition to obviating the need for accurately obtaining the absolute light intensities, the corrections for vignetting may also be conveniently avoided. Note that flat field corrections may still be required if there are spatial variations in pixel sensitivities in a camera.

Characteristics of Hyperspectral Thin Film Interferometry

Hyperspectral imaging when applied to thin film interferometry has some interesting characteristics. Firstly, the number of spectral classes is higher than in traditional hyperspectral imaging used for remote sensing or medical imaging. The number of spectral classes in thin film interferometry goes as $\mathcal{O}(T_{max}/T_{resolution})$, which is equal to 4,000 when trying to resolve film thickness of up to $T_{max}=$ 4,000 nm with a resolution of $T_{resolution}=1$ nm. Consequently, spectral matching routines used for thin film interferometry should have a high degree of specificity, and may also need optimization algorithms (as used in this invention) to completely reconstruct the thickness profile.

Secondly, the spectra vary gradually in space. Unlike traditional hyperspectral imaging where there are no spatial restrictions on the expected spectra, the spatial continuity of thin films constrains the spectrum to vary gradually in space. This is a direct consequence of the spectral map in FIG. 2A, where there is a gradual variation of the spectra as a function of film thickness. Consequently, spectral mixing (due to lack of sufficient camera resolution) does not pose difficulties during thickness reconstruction, thereby obviating any need for spectral unmixing techniques.

Thirdly, as thin liquid films are dynamic, the spectral signatures change rapidly both in space and time. As a consequence, snapshot hyperspectral imaging (as opposed to techniques such as the pushbroom) is better suited for thin film interferometry.

Comparison to Spectroscopic Ellipsometry

Ellipsometers utilize the change in the polarization state of light as it is reflected obliquely from a thin film to measure the film thickness. Ellipsometers are known for their sub-Angstrom precision, particularly when dealing with nanometric and sub-nanometric films. Spectroscopic ellipsometers are a class of ellipsometers that employ a range of wavelengths to perform the measurement, resulting in an improved measurement range spanning a few Angstroms to tens of microns. In addition, with the help of adequate models, they are also used to determine many optical and geometrical characteristics of thin films.

The herein reported hyperspectral thin film interferometry technique currently has a measurement accuracy of about a 100 nm and can measure film that are between 100 nm and 4,000 nm. Despite having an inferior range and accuracy, hyperspectral interferometry complements spectroscopic ellipsometry by addressing the following two important limitations. Firstly, ellipsometers have a poor spatial resolution, often restricted to measuring the thickness at a single point. This makes ellipsometers unsuitable for characterizing dynamic liquid films that are evolving in both space and time. Secondly, measurements using ellipsometers require an oblique angle of incidence. This makes the imaging of thin films on curved geometries very challenging. The capability of the current hyperspectral technique to characterize dynamic liquid films over curved geometries makes this technique attractive to many technical fields including that of colloid and interface science where thin liquid films involving bubbles, drops and the tear film are routinely studied.

SUMMARY

A compact setup is discussed herein employing snapshot hyperspectral imaging and the related algorithms for the automated determination of thickness profiles of dynamic thin liquid films. It has been shown that one would be able to reconstruct dynamic thin film profiles to within 100 nm of those reconstructed manually. As manually reconstructed profiles themselves are only accurate up to 50 nm, the automatic reconstructed profiles are a faithful representation of the ground truth. It has further been demonstrated herein through numerical experiments that hyperspectral interferometry has two key advantages, namely, the increased robustness against imaging noise and the ability to neglect the absolute light intensity information during thickness reconstruction.

Variations and/or enhancements of the embodiments provided herein may be focused on improving both the hardware and software aspects. Improvements in the spatial resolution, the sensor quantum efficiency, and the filter properties like transmissivity and FWHM of the hyperspectral imager could enhance the reconstruction performance. The results also suggest that improving the filters (especially the Q-factor) will have a significant impact on the robustness of the system. Finally, improvements in image pre-processing (like background subtraction) and in spectral matching algorithms (such as enhancing the specificity and robustness) will also aid in perfecting the embodiments of this invention.

What is claimed is:
1. A method for dynamic thin film measurements using hyperspectral imaging, comprising:
   (a) processing two-dimensional hyperspectral data of interference patterns of a dynamic thin film by:

(i) constructing a three-dimensional hyperspectral cube from the two-dimensional hyperspectral data;

(ii) subtracting a background spectrum from spectra in the three-dimensional hyperspectral cube; and (ii) denoising the background subtracted three-dimensional hyperspectral cube to obtain a preprocessed three-dimensional hyperspectral cube;

(b) matching the processed three-dimensional hyperspectral cube to a reference spectral map to obtain an initial thickness profile of the thin film by:

(j) generating the reference spectral map that defines a mapping between a physical thickness of the dynamic thin film and a corresponding spectral signature as expected to be observed by the hyperspectral imager; and (jj) applying geometric analysis and neighbor matching between each spectrum in the preprocessed three-dimensional hyperspectral cube and the reference generated spectral map to arrive at the initial thickness of the dynamic thin film; and (c) performing spatial optimization in an iterative process on the initial thin film thickness profile to obtain a final thin film thickness profile.

2. The method as set forth in claim 1, wherein the step of denoising is applying a hybrid mean filter.

3. The method as set forth in claim 1, wherein the corresponding spectral signature is corresponding spectral signature as expected to be observed by the hyperspectral imager according to thin interference theory.

4. The method as set forth in claim 1, wherein the dynamic thin film is a film whose thickness varies both in space and time.

5. The method as set forth in claim 1, wherein the dynamic thin film is a film whose thickness is not larger than 4 to 5 microns.

6. A method for dynamic thin film measurements using hyperspectral aging, comprising:

(a) acquiring two-dimensional hyperspectral data of interference patterns of a dynamic thin film using a hyperspectral imager; and (b) recovering thickness profiles of the dynamic thin film from the acquired two-dimensional hyperspectral data by:

(i) preprocessing acquired two-dimensional hyperspectral data by:

(j) constructing a three-dimensional hyperspectral cube from the acquired two-dimensional hyperspectral data;

(jj) subtracting an acquired background spectrum from spectra in the three-dimensional hyperspectral cube; and (jjj) denoising the background subtracted three-dimensional hyperspectral cube to obtain a preprocessed three-dimensional hyperspectral cube;

(ii) matching the preprocessed three-dimensional hyperspectral cube to a reference spectral map to obtain an initial thickness profile of the thin film by:

(p) generating the reference spectral map that defines a mapping between a physical thickness of the dynamic thin film and a corresponding spectral signature as expected to be observed by the hyperspectral imager; and (pp) applying geometric analysis and neighbor matching between each spectrum in the preprocessed three-dimensional hyperspectral cube and the reference generated spectral map to arrive at the initial thickness of the dynamic thin film; and (iii) performing spatial optimization in an iterative process on the initial thin film thickness profile to obtain a final thin film thickness profile.

7. The method as set forth in claim 6, wherein the step of denoising is applying a hybrid mean filter.

8. The method as set forth in claim 6, wherein the corresponding spectral signature is corresponding spectral signature as expected to be observed by the hyperspectral imager according to thin interference theory.

9. The method as set forth in claim 6, wherein the dynamic thin film is a film whose thickness varies both in space and time.

10. The method as set forth in claim 6, wherein the dynamic thin film is a film whose thickness is not larger than 4 to 5 microns.

* * * * *